(Model.)
J. S. ADAMS.
WIND WHEEL FRAME.
No. 244,971. Patented Aug. 2, 1881.
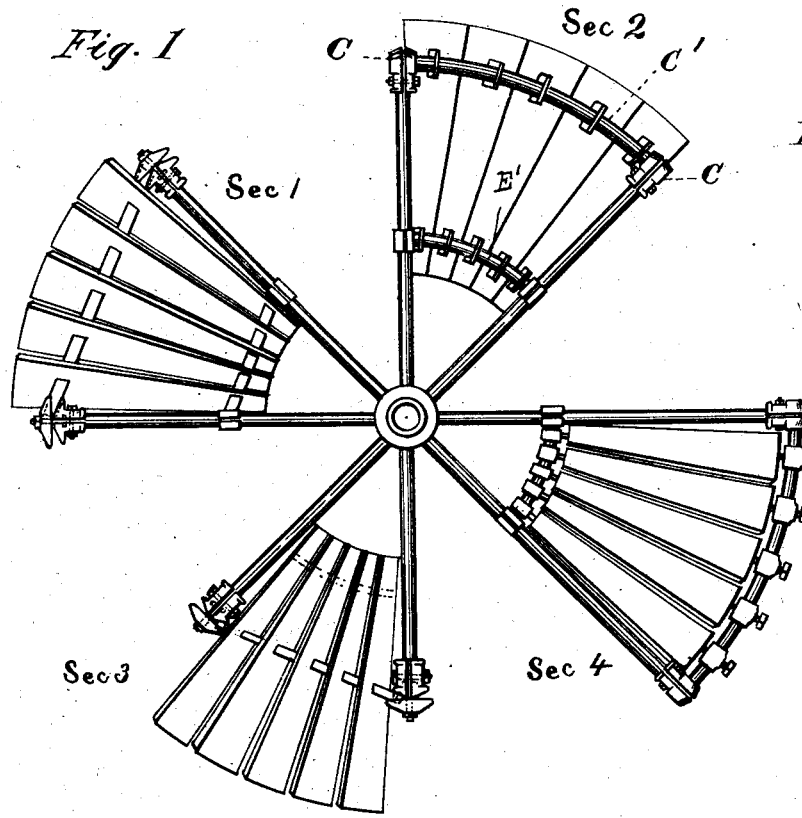
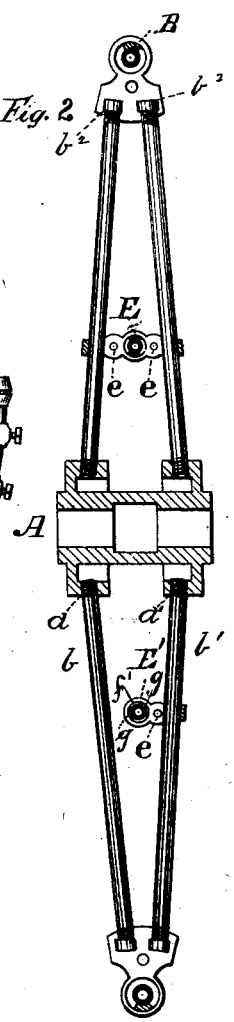
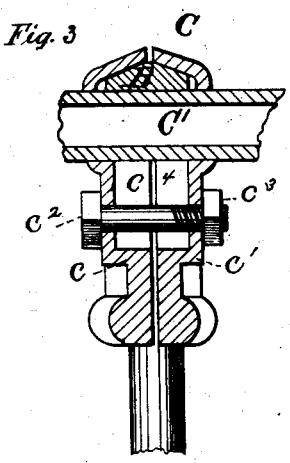
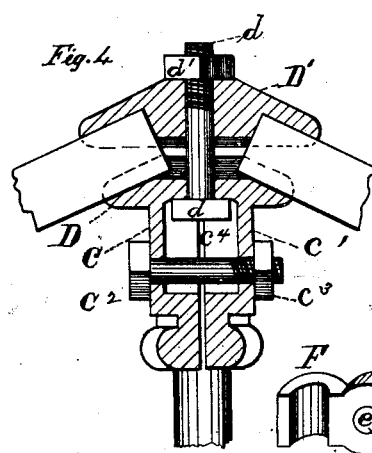
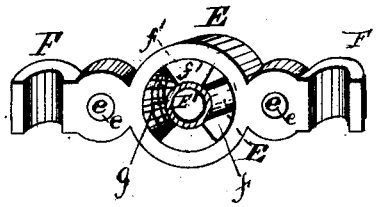

UNITED STATES PATENT OFFICE.

JOHN S. ADAMS, OF ELGIN, ILLINOIS.

WIND-WHEEL FRAME.

SPECIFICATION forming part of Letters Patent No. 244,971, dated August 2, 1881.

Application filed November 3, 1880. (Model.)

*To all whom it may concern:*

Be it known that I, JOHN S. ADAMS, a citizen of the United States, residing in Elgin, in the county of Kane and State of Illinois, have invented new and useful Wind-Wheel Frames, of which the following is a specification.

My invention relates to improvements in wind-wheels, in which the spokes are secured in and near each end of the hub in two rows oppositely arranged and converging toward each other from the hub to their outer ends, at which point they are connected together and to the outer rim, and provided with an inner coupling, which serves to clamp to the spokes an inner rim, to which rims the sails are secured; and the objects of my invention are, first, to provide a coupling for the inner and outer rims which, when closed, will simultaneously clamp the spokes and the rims together; second, to provide a two-part coupling adapted to simultaneously clamp the ends of spokes and connect said coupling with an adjustable and removable cap or clamping plate, between which and the end of the coupling is secured the ends of an angular rim of wood or other material. I attain these objects by mechanism illustrated in the accompanying drawings, in which—

Figure 1 represents the adaptation of my coupling or couplings to wheels having four different forms or methods for securing the sails to the frames of the wind-wheels. Fig. 2 is a vertical section through the wheel, the hub, and the clamping-plates; Fig. 3, a longitudinal section through the outer coupling and the rim; Fig. 4, a similar view through a modification of the same, which is adapted for clamping the ends of the pieces forming an angular rim; and Fig. 5, an inner side elevation of one half of the inner coupling.

Similar letters of reference indicate the same parts in the several figures of the drawings.

A represents the hub of a wind-wheel, which hub is provided near one end with a series of radiating screw-threaded sockets, $a$, to receive a corresponding series of spokes, $b$, and near its opposite end with similar sockets, $a'$, to receive spokes $b'$. Sockets $a\,a'$ are oppositely arranged in the hub and converge toward the center of length of the hub and each other, so that when the screw-threaded ends of the spokes are inserted in them the spokes $b\,b'$ will be in a plane with each other, but converge toward their outer ends. The inner ends of the spokes are screw-threaded to correspond with the perforations in the hub in which they are inserted, and the outer ends of the spokes are provided with caps or nuts, or else upset or circumferentially grooved, so that they may be held by the couplings to the rim.

C represents a coupling for rigidly connecting the ends of the spokes with the outer rim, C′, which coupling is formed of two plates, $c\,c'$, longitudinally grooved at one end to receive the spokes, and are adjustably connected together by a screw-threaded bolt, $c^2$, passing through them and provided with a nut, $c^3$, upon its end.

The plates $c\,c'$ are recessed so that when connected together an annular chamber, $c^4$, is formed to receive a cap, nut, flange, or groove, $b^2$, upon the ends of the spokes, which cap, flange, &c., serves to lock the spokes in the coupling and to permit an adjustment of them to true the rim without a liability of the spokes becoming detached from the same.

When a circular rim is used the coupling is transversely perforated, and extends some distance above such perforation to enable the introduction of a wedge or key, B, for rigidly securing the rim to the coupling. The under face of the upper end of the coupling is inclined, so that when the plates are drawn together by the bolt the wedge is tightened against this face and the rim; but when the rim is angular and in sections of squared timber or metal the outer ends of the plates $c\,c'$ terminate in a two-part plate, D, between which and a solid plate, D′, the ends of the sections are clamped by means of a headed bolt, $d$, passing through the plates D D′ and provided upon its outer end with a nut, $d'$, as shown in Fig. 4.

Plates D D′, when used in solid wheels, are provided with squared recesses, so that the timber will be firmly held in them, and it will be seen that the chamber $c^4$ serves to confine the head of the bolt $d$ as soon as the coupling is closed upon the spokes. When used in wheels in which the rim-sections are pivoted at the ends the coupling forms a bearing for the end pivot.

By constructing the coupling of two parts, such as I have described, it is not only adapted to be quickly put together, but of being tightened as the parts become worn by long use, and little or no skill and expense is involved in casting its parts. Furthermore, said coupling may be used upon a variety of wind-wheel frames, each having a different method of attaching and operating the sails, as shown in Fig. 1—as, for instance, Section 1 represents a portion of a solid wind-wheel frame in which the rim-sections are formed of straight bars of wood clamped, as described, in the outer and inner couplings. The sails are secured to the bars by being let into them and nailed in place. In this form of wheel the rims completed are angular instead of being concentric, as shown in Section 2.

It will be seen that concentric wooden rims may also be used by changing the forms of the clamping-surfaces of the cap and plates to correspond with the curves of the rim-sections.

Section 2 represents a portion of a solid wind-wheel frame in which the rim sections are formed of round iron or gas-pipe bent so as to form circular or concentric rims, to which the sails are attached by metallic clips.

Section 3 represents a portion of a sectional wind-wheel frame in which the outer rim sections are pivoted in the coupling, and the wheel is stopped or governed by presenting the ends of the sails to the wind at a proper angle for the desired object. In this wheel the outer couplings, instead of clamping the ends of the rim-sections, as described in Section 1, are made to form bearings for the pivots on the ends of the outer rim sections.

Section 4 represents a portion of a wind-wheel frame on which the sails are pivoted radially by means of pivots on their ends operating in sockets secured upon circular rims of wood or metal.

E represents a two-part coupling, clamped to one or both of the opposite spokes by means of bolts passing through a hole or holes, $e$, and provided with an enlargement which is centrally perforated, at $f$, to receive the inner rim, E′, said coupling having upon its end or ends a hook, F, which, when the parts are joined, forms an eye encircling the spoke. The perforation $f$ is of somewhat greater diameter than that of the rim, and has projecting from its walls a series of converging flanges, $f'$, between the ends of which the rim is held. These flanges serve to hold one or more wedges, $g$, driven into them, so as to press upon and give rigidity to the rim. By inserting the wedges from the inner faces of the coupling-plates they may be tightened by the plates when securing the latter upon the spokes.

Although I prefer to make the inner coupling so as to embrace both of the oppositely-arranged spokes, as shown in the upper part of Fig. 2, it is obvious that it may be secured to only one of them, as shown in the lower part of said figure, without departing from the spirit of my invention.

I prefer to construct the hub with an annular rim, as shown in Fig. 2, to receive the spokes, for the reason that by having the annular rim the drilling of the sockets is facilitated.

What I claim, and desire to secure by Letters Patent, is—

1. The combination, with the spokes and with the rim of a coupling, of two or more parts removably and adjustably connecting said spokes and rim, and provided with a chamber or recess, as and for the purpose described.

2. The combination, with the rim and with the spokes, of a rigid coupling adapted to be simultaneously and adjustably connected with said spokes and rim, substantially as described and shown.

3. In a coupling, the combination, with the plates $c c'$, grooved and perforated, as described, of bolt $c^2$, nut $c^3$, and wedge B, as shown.

4. The two-part coupling E, perforated at $f$ to receive the inner rim of a wind-wheel and the wedge $f'$, adapted to be rigidly secured upon the spoke or spokes of said wind-wheel, as described and shown.

5. The two-part coupling E, adapted to be secured to the spokes of a wind-wheel, and having a perforation, $f$, and converging flanges of a rim, E′, and wedge $f'$, substantially as and for the purpose set forth.

JOHN S. ADAMS.

Witnesses:
 JNO. G. ELLIOTT,
 WM. C. WHITING.